United States Patent [19]

Ohkumo

[11] Patent Number: 4,803,967
[45] Date of Patent: Feb. 14, 1989

[54] SYSTEM FOR CONTROLLING IGNITION TIMING OF AN INTERNAL COMBUSTION ENGINE

[75] Inventor: Hiroya Ohkumo, Tokyo, Japan

[73] Assignee: Fuji Jukogyo Kabushiki Kaisha, Tokyo, Japan

[21] Appl. No.: 135,656

[22] Filed: Dec. 21, 1987

[30] Foreign Application Priority Data

Dec. 26, 1986 [JP] Japan ................... 61-310255

[51] Int. Cl.$^4$ .................................... F02P 5/04
[52] U.S. Cl. ..................... 123/422; 123/418
[58] Field of Search ............. 123/422, 414, 416, 417, 123/406, 418, 423, 480

[56] References Cited

U.S. PATENT DOCUMENTS

| | | | |
|---|---|---|---|
| 3,935,845 | 2/1976 | Aono et al. | 123/422 |
| 4,445,479 | 5/1984 | Takakuwa et al. | 123/422 |
| 4,448,163 | 5/1984 | Yoshida | 123/422 |
| 4,508,079 | 4/1985 | Komususaki et al. | 123/422 |
| 4,570,594 | 2/1986 | Egami et al. | 123/422 |
| 4,601,272 | 9/1986 | Nagai | 123/422 |

Primary Examiner—Raymond A. Nelli
Attorney, Agent, or Firm—Martin A. Farber

[57] ABSTRACT

A system for controlling ignition timing has a detector for detecting load on an automotove engine and for producing a load signal when the load is larger than a predetermined value. In response to the load signal, an advance angle is provided. The advance angle is added to a basic ignition timing to produce a desired ignition timing. The system operates to excite an ignition coil of the engine to form a spark at a spark plug at the desired ignition timing.

4 Claims, 3 Drawing Sheets

SYSTEM FOR CONTROLLING IGNITION TIMING OF AN INTERNAL COMBUSTION ENGINE

BACKGROUND OF THE INVENTION

The present invention relates to a system for controlling ignition timing of an internal combustion engine such as an automotive engine, and more particularly to a system for advancing the ignition timing at acceleration of the engine.

In a conventional ignition timing control system, the top dead center is detected by a crank angle sensor and the ignition timing is set in advance of it. A period of time for a dwell angle, through which current passes in a primary winding of an ignition system, is further taken account of to determine the timing for starting the current to flow in the primary winding. At the advanced ignition timing, the current is cut off so that a spark plug generates a spark by the high voltage produced in a secondary winding. The ignition timing is set close to a maximum ignition timing MBT shown in FIG. 3 to obtain a maximum torque. However, when the ignition timing is advanced too close to the MBT, the auto-ignition of highly compressed end-gas occurs. Thus, the pressure in the combustion chamber rapidly increases, causing knocking of the engine. Accordingly, there is a limit timing $A_1$ for limiting the advance of the ignition timing. Namely, in order to prevent knocking, the timing is set at the timing $A_1$. However, the ignition timing is further retarded from the timing $A_1$ to a ignition timing $A_2$ by a surplus time $\alpha$ as a safeguard against knocking. The time $\alpha$ is provided in consideration of timing variances caused by manufacturing tolerances of the engine, retardation of the limit timing $A_1$ by deterioration of the ignition system, and other factors.

However, as shown in FIG. 3, torque inevitably drops from $T_1$ to $T_2$ because of the retardation of the time $\alpha$. Particularly a sufficient acceleration characteristic of the engine can not be obtained. Thus, it is necessary to adjust the timing for the acceleration.

Japanese Patent Laid Open No. 59-145364 discloses an ignition timing control system wherein the ignition timing is advanced when the rapid acceleration of the vehicle is detected by throttle opening degree and changing rate thereof. However, since the acceleration is determined dependent on the operation of the throttle valve only, the detected acceleration does not necessarily coincide with the actual acceleration of the vehicle.

SUMMARY OF THE INVENTION

The object of the present invention is to provide a system for controlling the ignition timing where torque of the engine at the acceleration thereof is increased with the least possible occurrence of knocking.

In accordance with the present invention, the system has engine load detecting means and vehicle acceleration means. When the load and the acceleration exceed predetermined values respectively, ignition timing is advanced within a range in which knock of the engine does not occur.

According to the present invention, there is provided a system for controlling ignition timing of an automotive engine mounted on a vehicle, comprising first detector means for detecting engine operating conditions including engine speed and for producing an operating signal dependent on the detected conditions, first calculator means responsive to the operating signal for producing a basic ignition timing, second detector means for detecting load on the engine and for producing a load signal when the load is larger than a predetermined first load value, first means responsive to the load signal for producing an advance angle, second calculator means for adding the advance angle to said basic ignition timing and for producing a desired ignition timing, adjusting means responsive to the desired ignition timing for exciting an ignition coil of the engine to form a spark at a spark plug at the desired ignition timing, acceleration detecting means for detecting acceleration of the vehicle and for producing an acceleration signal when the acceleration is larger than a predetermined acceleration value, the first means being arranged to produce the advance angle in response to the load signal and the acceleration signal.

In an aspect of the invention, the system further comprises means for detecting coolant temperature of the engine and for producing a temperature signal when the coolant temperature is higher than a predetermined value, and second means responsive to the coolant temperature signal for inhibiting the adding of the advance angle.

The second detector means produces an inhibition signal when the load is smaller than a predetermined second load value, the second means is responsive to said inhibition signal for inhibiting the adding of advance angle.

The other objects and features of this invention will become understood from the following description with reference to the accompanying drawings.

DETAILED DESCRIPTION OF THE PREFERRED EMBODIMENT

Figure 1:
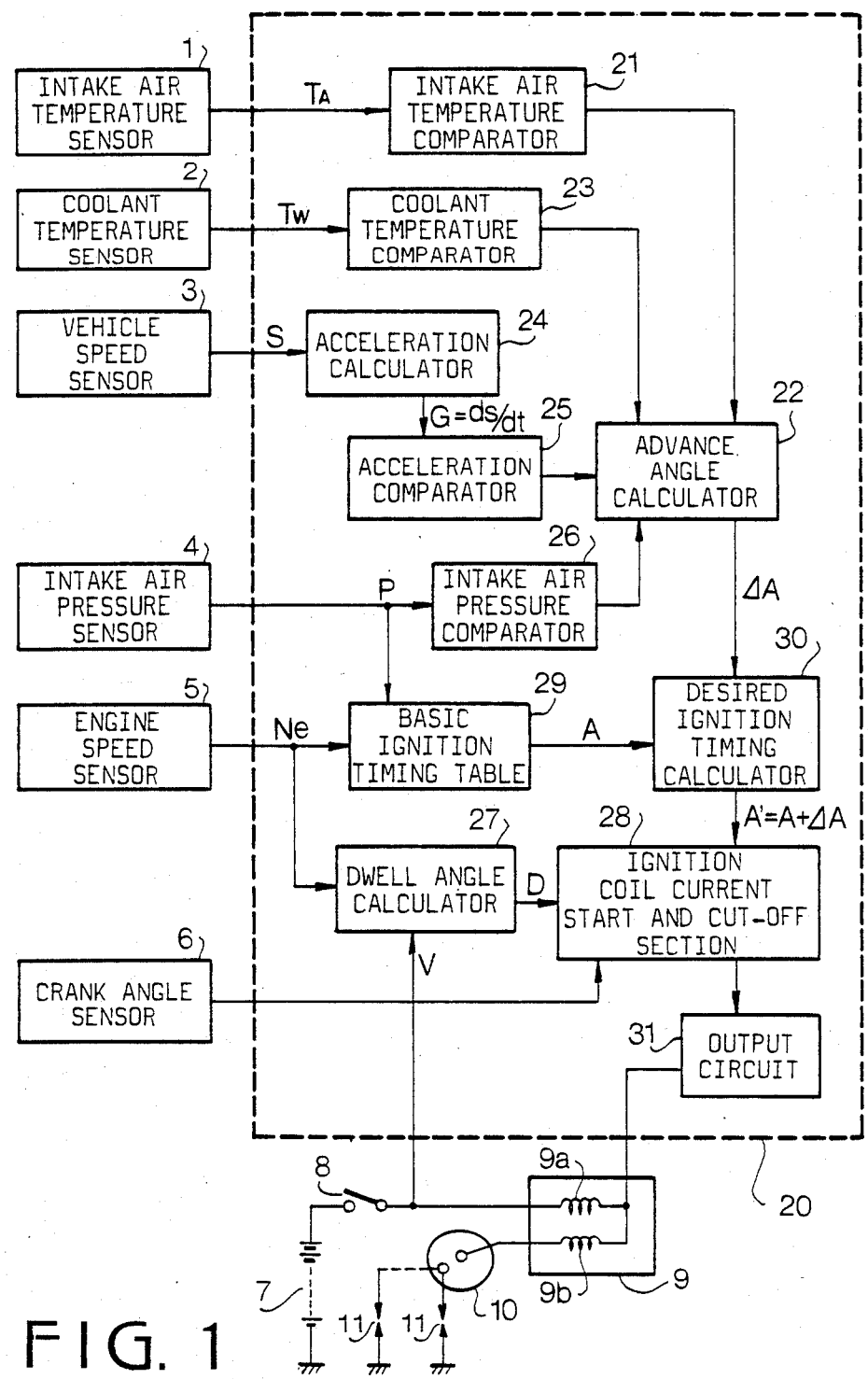
FIG. 1 is a block diagram showing a control system according to the present invention.

Referring to FIG. 1, the ignition timing control system of the present invention comprises an intake air temperature sensor 1 of an engine mounted on a vehicle, coolant temperature sensor 2, vehicle speed sensor 3, intake air pressure sensor 4 for detecting engine load, engine speed sensor 5 and crank angle sensor 6. The output signals of the sensors 1 to 6 are applied to a control unit 20. The output of the control unit 20 is connected to a primary winding 9a and secondary winding 9b of an ignition coil 9 which is also connected to a battery 7 through a key switch 8. The secondary winding 9b of the ignition coil 9 is connected to spark plugs 11 through a distributer 10. A supply voltage between the switch 8 and the ignition coil 9 is applied to the control unit 20.

The control unit 20 has a basic ignition timing table 29 from which a basic ignition timing A is derived in accordance with intake air pressure signal P from the intake air pressure sensor 4 and engine speed signal Ne from the engine speed sensor 5.

In order to adjust the ignition timing, the control unit 20 is provided with an intake air temperature comparator 21 and coolant temperature comparator 23, wherein intake air temperature $T_A$ and coolant temperature $T_W$ are compared with predetermined values $T_{A1}$ and $T_{W1}$, respectively. When the intake air temperature $T_A$ is higher than $T_{A1}$ or when the coolant temperature $T_W$ is higher than $T_{W1}$, the comparator 21 or 23 applies an inhibition signal to stop the advance or to reduce advance angle $\Delta A$. Vehicle speed S detected by the vehicle sensor 3 is applied to an acceleration calculator 24 where acceleration G of the vehicle is calculated in accordance with an equation, $G=ds/dt$. The acceleration G is applied to an acceleration comparator 25 where the acceleration G is compared with two predetermined reference values $G_1$ and $G_2$ ($G_1>G_2$). The two reference values are provided so that the system may have a hysteresis effect. When the acceleration G is larger than the predetermined high value $G_1$ ($G \geq G_1$), it is determined that the vehicle is accelerating. In the acceleration state the comparator 25 produces an advance first signal which is applied to an advance angle calculator 22. The advance adjustment is stopped when the acceleration G becomes smaller than the predetermined low value $G_2$ ($G<G_2$). Pressure P from the intake air pressure sensor 4 is applied to an intake air pressure comparator 26 having two reference values $P_1$ and $P_2$ ($P_1>P_2$). When the pressure P is larger than the high value $P_1$ ($P \geq P_1$), the comparator 26 produces an advance second signal. The advance is terminated when the pressure P becomes smaller than the low value $P_2$ ($P \leq P_2$). The advance first and second signals are applied to an advance angle calculator 22 to produce an advance angle $\Delta A$. The basic ignition timing A and the advance angle $\Delta A$ are applied to a desired ignition timing calculator 30 where a desired ignition timing $A'$ is obtained by adding the advance angle $\Delta A$ to the basic ignition timing A.

Additionally, the control unit 20 comprises a dwell angle calculator 27 to which the engine speed signal Ne and supply voltage V are applied. The dwell angle calculator 27 calculates a dwell angle D. The dwell angle D, desired ignition timing $A'$ and crank position detected by the crank angle sensor 6 are applied to an ignition coil current start and cut-off section 28 so as to determine the actual timing for starting the flow of the current. The output of the start and cut-off section 28 is supplied to an output circuit 31 to close the circuit for the primary winding of the injection coil 9 for the duration dependent on the output. Thus, high voltage generated at the secondary winding is applied to the spark plugs 11 through the distributor 10 thereby forming sparks.

Figure 2:
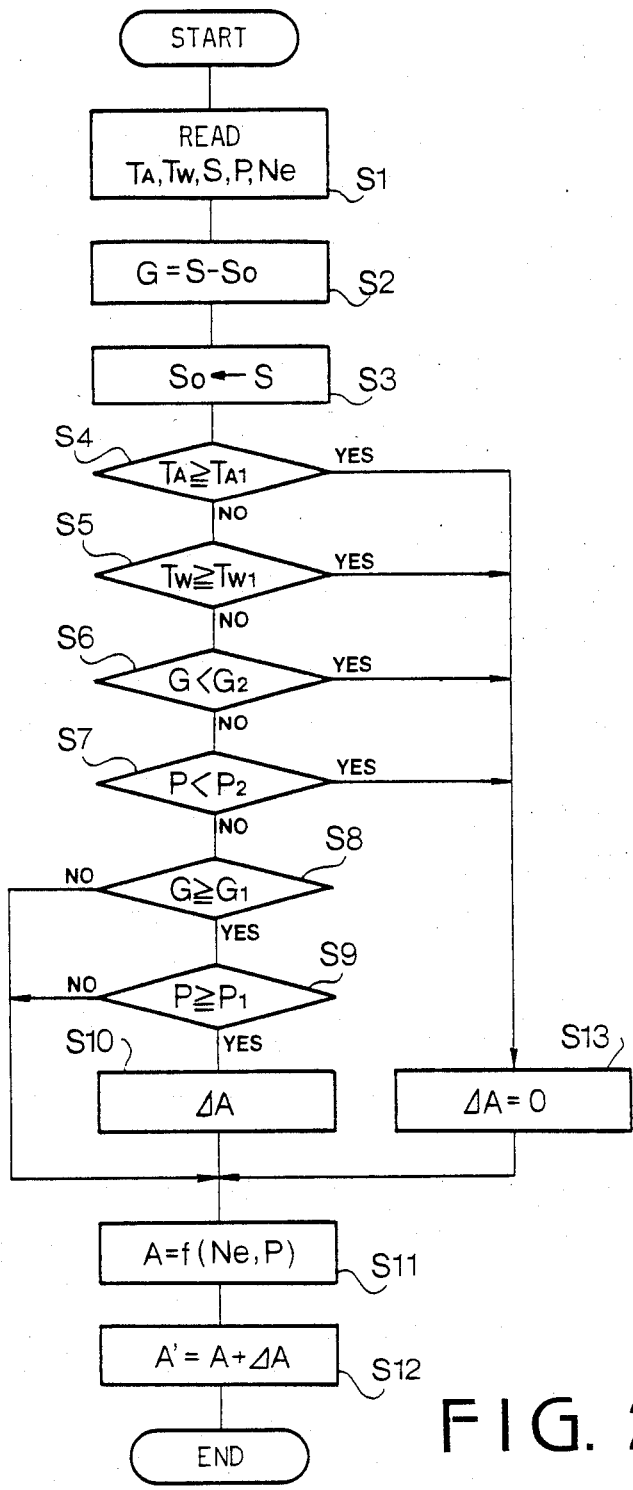
FIG. 2 is a flow chart showing the operation of the system.
Figure 3:
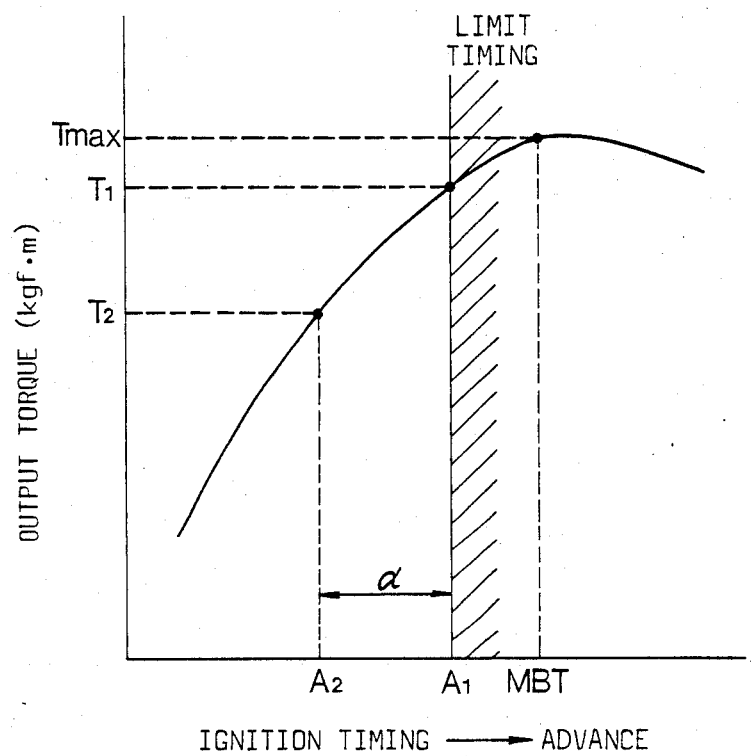
FIG. 3 is a graph showing a relationship between engine torque and ignition timing.

The operation of the present invention is described hereinafter with reference to the flow chart of FIG. 2. The program starts at a regular interval.

At a step S1, intake air temperature $T_A$, coolant temperature sensor $T_W$, vehicle speed S, intake pressure P and engine speed Ne are read out. At a step S2, the acceleration G is obtained by subtracting vehicle speed So, which is a vehicle speed detected at the last program, from the present vehicle speed S. The previous vehicle speed So is substituted by the present vehicle speed S at a step S3. At steps S4 and S5, it is determined whether the intake air temperature $T_A$ and coolant temperature $T_W$ are higher than the predetermined values $T_{A1}$ and $T_{W1}$. When intake air temperature $T_A$ or coolant temperature $T_W$ is higher than the reference value, knocking of the engine may occur. Accordingly, the comparator 21 or 23 produces the inhibition signal to set the advance angle $\Delta A$ to zero at a step S13. If the temperatures $T_A$ and $T_W$ are lower than the predetermined values, the program proceeds to a step 6 where the acceleration G obtained at step S2 is compared with the predetermined low reference value $G_2$.

When the acceleration G is larger, the intake air pressure P is then compared with the predetermined low value $P_2$ at a step S7. When the pressure P is higher, it is further determined whether the acceleration G is higher than the predetermined high value $G_1$ at a step S8 and whether the intake air pressure P is higher than the high value $P_1$ at a step S9. If both are determined, an advance angle $\Delta A$ is obtained at a step S10. At a step S11, the basic ignition timing A is derived from the table 29. The basic ignition timing A and the advance angle $\Delta A$ are added to obtain the desired ignition timing $A'$ at a step S12. Thus, the ignition timing is advanced so as to increase the engine torque.

After the adjustment of timing, the intake air temperature $T_A$ and the coolant temperature $T_W$ may possibly exceed the respective predetermined value $T_{A1}$ and $T_{W1}$. In that case, the program proceeds from step 4 or 5 to step 13, thereby stopping the advancement. Thus, knocking of the engine is prevented.

When the acceleration G or the intake air pressure P becomes smaller or lower than the respective high values $G_1$ and $P_1$ at step S8 or S9, the program proceeds to the step S11 without calculating the advance angle $\Delta A$. Accordingly, the advance angle $\Delta A$ calculated at the last program is used to calculate the desired ignition timing $A'$ at the step S12.

When the acceleration G of the vehicle is further decreased so that it is determined to be smaller than the low value $G_2$ at the step S6, the program proceeds to the step S13. Similarly, if it is determined that the pressure P is smaller than the low value $P_2$ at the step S7, the program also proceeds to the step S13. Accordingly, the advancement is altogether stopped.

The present invention may be modified so as not to entirely stop the adjustment when the intake air temperature and coolant temperature are higher than reference values, but to reduce the advance angle in accordance with the temperatures.

According to the present invention, adjustment of ignition timing is performed for a period while the vehicle is rapidly accelerated at high engine load, and not during the driving conditions where knocking tends to occur. Thus, the acceleration characteristic of the engine is increased without causing knocking and affecting the durability of the engine.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling ignition timing of an automotive engine mounted on a vehicle, having detector means for detecting engine operating conditions including engine speed and for producing an operating signal dependent on the detected conditions, basic ignition timing calculating means responsive to said operating signal for producing a basic ignition timing, load detecting means for detecting load on said engine and for producing a load signal when the load is larger than a predetermined first load value, advance angle decision means responsive to said load signal for producing an advance angle, desired ignition timing decision means for adding said advance angle to said basic ignition timing and for producing a desired ignition timing, and adjusting means responsive to said desired ignition timing for exciting an ignition coil of said engine to form a spark at a spark plug at the desired ignition timing, the improvement in the system wherein said detector means comprises acceleration detecting means for detecting acceleration of the vehicle and for producing an acceleration signal when the acceleration is larger than a predetermined acceleration value, and said advance angle decision means being arranged to produce said advance angle in response to said load signal and said acceleration signal.

2. The system according to claim 1, wherein
said detector means further comprising
coolant temperature detecting means for detecting coolant temperature of said engine and for producing a first temperature signal when the coolant temperature is higher than a first predetermined value, and inhibiting means responsive to said first temperature signal for inhibiting the adding of the advance angle.

3. The system according to claim 2, wherein
said load detecting means produces an inhibition signal when said load is smaller than a predetermined second load value, and said inhibiting means is responsive to said inhibiting signal for inhibiting the adding of the advance angle.

4. The system according to claim 1, wherein
said detector means further comprises
intake air temperature detecting means for detecting intake air temperature of said engine and for producing a temperature signal when the intake air temperature is higher than a predetermined value, and inhibiting means responsive to said temperature signal for inhibiting the adding of the advance angle.

* * * * *